July 16, 1968  J. ALLEAUME  3,392,866
INSULATION FOR FLUID-TIGHT ENCLOSURES
Filed July 7, 1965  6 Sheets-Sheet 3

Inventor
Jean ALLEAUME
By: Nolte & Nolte
ATTORNEYS

July 16, 1968   J. ALLEAUME   3,392,866
INSULATION FOR FLUID-TIGHT ENCLOSURES
Filed July 7, 1965   6 Sheets-Sheet 6

Inventor
Jean ALLEAUME
By: Nolte & Nolte
ATTORNEYS

United States Patent Office 3,392,866
Patented July 16, 1968

3,392,866
INSULATION FOR FLUID-TIGHT ENCLOSURES
Jean Alleaume, Saint-Cloud, France, assignor to Technigaz, Paris, France, a body corporate of France
Filed July 7, 1965, Ser. No. 470,155
Claims priority, application France, July 10, 1965, 981,493
32 Claims. (Cl. 220—15)

ABSTRACT OF THE DISCLOSURE

A heat-insulating wall construction for a fluid-containing enclosed space, comprising an outer supporting structure to which a plurality of rectangular panels, juxtaposed side by side and end to end, are individually secured in spaced relation thereto by connecting spacers; and at least one inner flexible, fluid-confining, impervious, continuous lining, backed by and fastened to said panels which include each one at least one inner stiff insulating plate and at least one layer of insulating material filling the space between said supporting structure and plate; said spacers being arranged to allow thermal expansion and contraction of said plate.

---

The present invention has essentially for its objects a device constituting an insulation or the like for fluid-tight enclosures and its various applications.

Laggings of the type comprising juxtaposed self-supporting panels of the stratiform or multilayer type, adapted to be secured to an external supporting structure and constituting a continuous wall of a fluid-tight enclosure or container are already known; they are preferably lined on their inner side with an impervious casing containing said fluid and carried by said lagging interposed between said casing and said structure. This arrangement is found notably in the case of tanks for the cryogenic preservative of liquefied gas at very low temperature, such as methane, and the so-called built-in tanks forming an integral part of the hull of a ship for transporting this liquefied gas.

Preferably, the insulation intended for such enclosures is divided into panels for example of rectangular or square configuration with a view to facilitate heat distortions and the locating of possible failures or defects in the lagging.

It is the object of the present invention to provide an insulation of the type specified hereinabove, of which the mounting is such as to permit the relative mutual movements of the layers constituting each insulating panel as a consequence, or under the influence, of its heat distortions or thermal deformations. The device according to this invention is remarkable notably in that each insulating panel aforesaid comprises at least one inner limit or end layer forming a rigid or stiffened plate, for example of plywood or the like, at least one intermediate or filling layer of solid coherent or pulverulent material, and connecting or binding elements acting as spacer elements or the like which extend through said intermediate layer and fastening or assembling said rigid plate either to another rigid plate constituting an outer end layer or directly to said supporting structure, said spacer elements having such mutual relative shape and orientation as to permit the heat contraction or expansion of said plate.

The present invention is also concerned with the various applications of the device broadly set forth hereinabove, notably fixed or movable fluid-tight enclosures or containers constituting tanks, reservoirs, cisterns, vats, vessels, holds, chambers, bunkers or the like intended for preserving, storing or transporting miscellaneous liquid or gaseous fluids at temperatures differing very considerably from the surrounding or ambient temperature.

Other features and advantages of this invention will appear as the following more detailed description proceeds with reference to the attached drawings illustrating diagrammatically by way of example several forms of embodiment of the invention. In the drawings.

Figure 1:
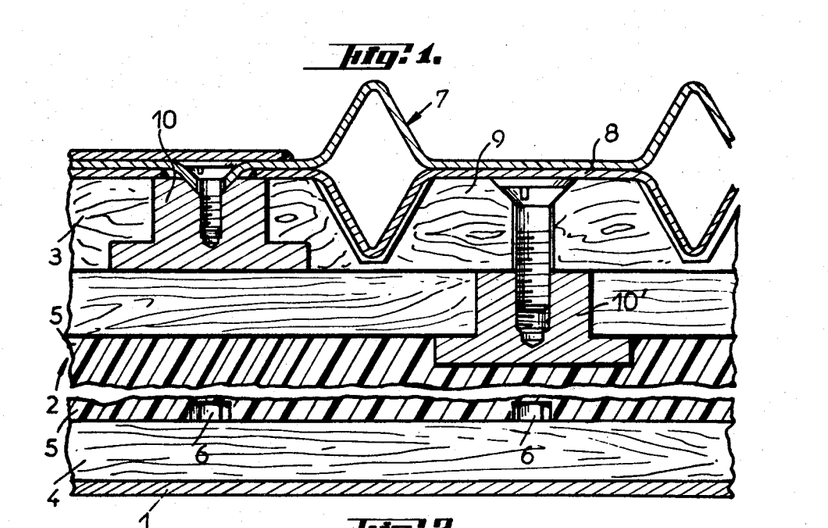
FIGURE 1 is a fragmentary sectional view taken across the thickness of the wall of a built-in tank or the like, having a primary barrier and a secondary barrier applied against and in contact with each other, and constructed according to the teachings of this invention.

The exemplary form of embodiment illustrated in FIGURE 1 refers to the application of this invention to the construction of a tank forming an integral part of the hull structure of a ship. This construction would also be applicable, of course, to stationary storage installations, such as underground or subterranean storage tanks, or tanks erected in fixed buildings or transported on rolling vehicles. The reference numeral 1 designates the hull of a ship or its inner plating supporting the lagging or insulation 2 of the wall of a tank intended for containing for example liquefied gas at very low temperature. This insulation may consist for example of a sandwich or like structure comprising relatively rigid or stiffened plates 3, 4 of heat-insulating material such as plywood, between which a layer 5 of insulating material of preferably cellular texture, is disposed. The insulation 2 is secured to the supporting structure consisting of the hull 1 by means of fastening members 6 such as bolts, studs or the like which secure more particularly the external plate 4 to the hull structure 1.

The inner plate 3 has its inboard facing face lined with a fluid-tight skin of a casing adapted to contain the fluid to be preserved and consisting preferably of two directly contacting walls 7, 8 constituting respectively the primary barrier and the secondary barrier, which are applied against and fastened to the insulation 2. These primary and secondary barriers consist of an assembly of relatively thin plates, sheets or the like, preferably from sheet metal stock, so as to constitute each a relatively flexible or resilient membrane completely supported by the insulation and adapted to transmit directly and integrally thereto all the efforts and stresses to which they are subjected in actual operation by the contained fluid. These two primary and secondary barriers are advantageously corrugated, pleated or otherwise crimped or dimpled in order to have an excess of material in the direction of their surface, adapted to promote heat distortions. The two primary and secondary corrugated barriers respectively 7 and 8 are applied against the insulation 2 with the interposition of shaped blocks 9 recessed with clearance along the corrugations so as to correspond in shape to the waves thereof without any contact therewith. These barriers 7, 8 are fastened to the insulating blocks 9 by means of anchoring members 10 and the insulating blocks 9 are secured in turn to the plate 3 by means of similar anchoring members 10'.

The insulation 2 is advantageously divided into panels of preferably rectangular or square configuration for the reasons set forth hereinabove. These panels are advantageously relatively small sized for example with 3-feet long sides in order to reduce the magnitude of heat deformations and stresses. The respectively primary and secondary metal barriers directly contacting the cold fluid tend to contract due to the strong cooling action exerted by this fluid; however, this contraction is counteracted by the aforesaid connections and the stress resulting from this contraction will be transmitted through said connections to the inner plate 3 of the insulation of which the contraction tends in turn to carry along by creeping frictional contact the adjacent insulating layers. Therefore, connecting spacer elements must be provided between the inner plate 3 and the outer plate, or the supporting structure, in order to resist to a certain extent the aforesaid creep or sliding movement.

Figure 2:
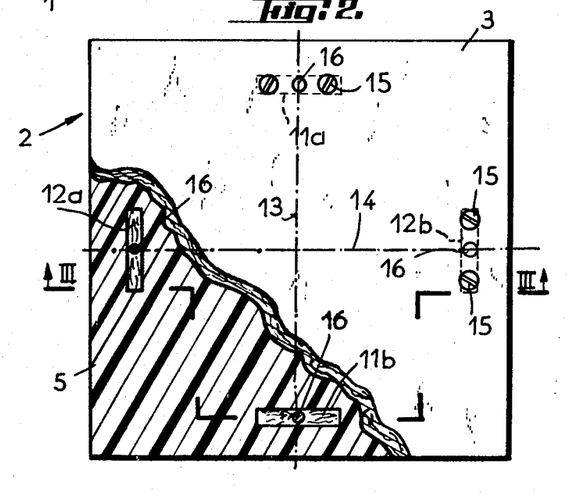
FIGURE 2 illustrates on a smaller scale in front view with parts broken away an insulating panel of the sandwich type with spacing elements and an intermediate layer of coherent material.
Figure 3:
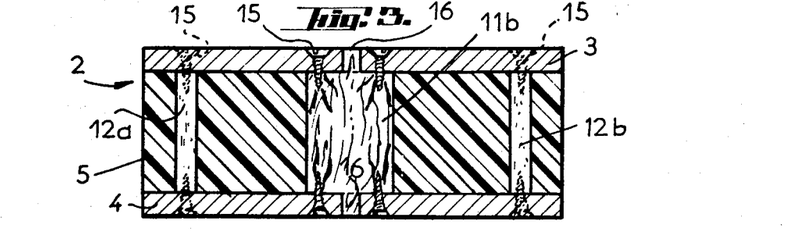
FIGURE 3 is a section taken along the broken line III—III of FIGURE 2.

Thus, in the specific case of an insulating panel of the type set forth hereinabove, which has a mechanical strength sufficient to withstand the normal compressive stresses exerted by the contained fluid but not sufficient to withstand the tangential frictional creeping or sliding efforts resulting from said contractions, the insulating panel 2 comprises at least two preferably substantially parallel plates such as 3, 4 rigidly assembled by spacing elements secured to said plates and disposed symmetrically by pairs in relation to the centre of symmetry of said panel. FIGURES 2 and 3 illustrate by way of example a typical form of embodiment of a panel of this character which is of square configuration and comprises two pairs of spacer elements 11a, 11b and 12a, 12b preferably of substantially flattened parallelepipedic or trapezoidal shape; these spacer elements are disposed preferably substantially symmetrically along the mesial lines 13, 14 of the sides or edges of said panel, so as to bear edgewise with their narrow faces or end faces against the aforesaid plates 3, 4 and extend substantially at right angles to said lines with their major faces. This relative arrangement of the spacer elements facilitates or promotes their tendency to tilt in the respective direction of said mesial lines during the contraction of the cold plate in the two respectively perpendicular directions of these lines 13 and 14.

The operation of this arrangement will be readily understood. When the cold plate 3 contracts substantially parallel its plane and in relation to the relatively warm outer plate 4, the contraction of plate 3 parallel to the direction of the mesial line 13 will tend to move towards each other the ends of spacer elements 11a, 11b which are secured to said plate 3, whereby they are somewhat tilted about their end faces engaging the outer plate 4. The same applies to spacer elements 12a, 12b which follow substantially the contraction of plate 3 in a direction parallel to the mesial line 14.

Instead of being disposed in the direction of the mesial lines 13 and 14, the two pairs of spacing elements 12a, 12b and 11a, 11b may of course be disposed according to the diagonals of each separate panel constituting the lagging 2.

These spacer elements may advantageously consist of wood such as lamellar or compressed wood and be secured to the plates 3, 4 respectively by means of screws or like fastening members 15 extending through the plates 3, 4. To improve the fastening strength of the assembly each spacer element may have its ends more or less embedded in the corresponding plate 3 or 4 by means of a shouldered stud, tit or like member or portion 16 fitting in a suitable corresponding orifice of said plate.

Figure 4:
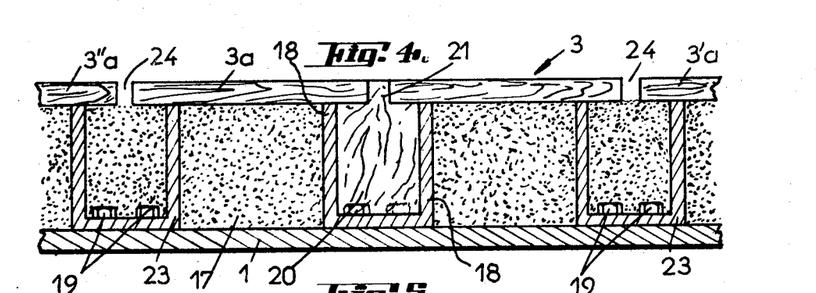
FIGURE 4 is a cross-section taken upon the line IV—IV of FIGURE 5 through the thickness of one portion of a wall provided with a lagging and fastened directly to the external supporting structure.
Figures 5, 6, 7:
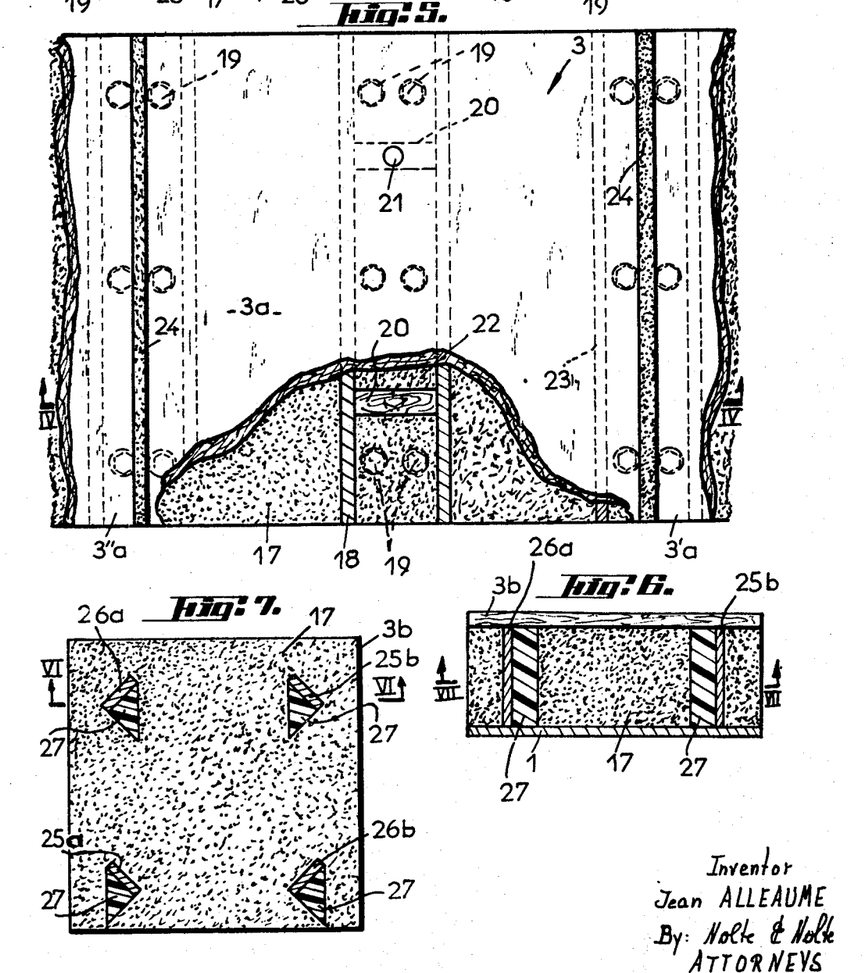
FIGURE 5 is a front view with parts broken away as seen from the inner side of the insualting panels of FIGURE 4.
FIGURE 6 is a cross-section taken upon the line VI—VI of FIGURE 7 across the thickness of an insulating lagging secured directly to the supporting structure with spacing elements and an intermediate layer of pulverulent material introduced by gravity-feed filling.
FIGURE 7 is a front view of the inner plate of FIGURE 6, as seen from the side of the spacing elements these being shown in cross-section taken upon the line VII—VII of FIGURE 6.

FIGURES 4 and 5 illustrate the case wherein each insulating plate comprises an intermediate insulating layer 17 of pulverulent or divided character and an inner plate 3a secured preferably directed to the supporting structure 1 consisting of the aforesaid ship's hull by means of a substantially channel or trough-shaped insulating bar 18, for example a wooden brace-lath, strip or cleat extending substantially along a mesial line of plate 3a throughout the length or width thereof, and secured by its web to the structure or hull 1 and bearing with the edge of its flanges against the plate 3a so that the central cavity or recess of the U-sectional bracing-lath, strip or cleat 18 faces this plate 3a. The brace-lath, strip or cleat 18 is secured to the wall of hull 1 by means of screws, bolts, studs or the like 19 and connected to the plate 3a by means of at least two substantially parallel spacer elements or like members 20 spaced from each other and mounted across the cavity or recess of brace-lath, strip or cleat 18 in which they are held for example by tight fitting. These spacer elements 20 also made of adequate insulating material such as lamellar or compressed wood or plywood are secured to the inner plate 3a for example by fitting in said plate a shouldered stud or tit portion or like projection 21 rigid with each spacer element. The free space left in the recess of brace-lath 18 may advantageously be filled with a cellular, fibrous or, if desired pulverulent insulating material 22.

Therefore, the insulation consists of a plurality of juxtaposed panels such as 3a, 3'a, 3"a, etc., each carried by a central brace-lath 18. The central disposition of this brace-lath 18 with respect to each panel such as 3a does not interfere, or interferes only to a minimum degree, with any contraction of plate 3a in a direction substantially at right angles to the brace-lath 18.

The adjacent, preferably spaced, edges of two juxtaposed adjacent plates such as 3a and 3'a are supported respectively under free bearing conditions by the edges of the flanges of a channel-like marginal brace-lath 23 similar and substantially parallel to the central brace-lath 18 by being fitted straddle-wise behind the joint 24 between the two adjacent plates 3a, 3'a. The free bearing engagement of the edges of any pair of adjacent panels 3a, 3'a on a marginal brace-lath 23 secured in turn to the supporting structure or hull 1 permits a substantially unimpaired heat contraction or expansion of said plates.

FIGURES 6 and 7 illustrate respectively a form of embodiment somewhat similar to the preceding one and concerning more particularly an inner panel 3b extending vertically and secured directly to the supporting structure or hull 1 by means of two intermediate pairs of spacer elements 25a, 25b and 26a, 26b. In this alternate form of embodiment the intermediate insulating layer interposed between the plate 3b and hull 1 consists of a pulverulent material 17 introduced by filling the space left between the plate 3b and hull 1, that is, by pouring from the top the free-flowing pulverulent insulating material into said space, whereby the pulverulent insulating material will fall by gravity substantially vertically and accumulate in said space. Of course, this mode of operation is attended by the inconvenience of leaving after filling empty or dead pockets or voids just underneath each spacer element where the pulverulent materials cannot fall.

To avoid this inconvenience each dead pocket or empty space aforesaid associated with each brace-lath is filled by means of a block or piece of coherent insulating material, for example cellular material, of such shape and dimensions as to fill up substantially said dead or empty space as set forth hereinabove. Thus, as shown in FIGURE 7, the two pairs of spacer elements aforesaid are disposed respectively symmetrically with respect to the diagonals of plate 3b, so that one pair of spacer elements be substantially perpendicular to a diagonal and for example substantially parallel to the other diagonal associated with the other pair of spacer elements in the case of a square plate. As a result, the various spacer elements are inclined to the horizontal and the reference numeral 27 designates the blocks of coherent insulating materials adapted to fill up the aforesaid empty spaces. These blocks or pieces of coherent insulating material are preferably glued or cemented at least against the lower face of the aforesaid spacer elements, thus providing a complete and efficient filling of all the intermediate space between the plate 3b and the supporting structure 1.

The plate 3b of the insulating panel should be stiff enough to efficiently withstand the pressure exerted by the fluid contained in the tank when the latter is full and also the pressure exerted by the pulverulent insulating material forming the intermediate layer 17 when the tank is empty.

In the general case of an intermediate layer consisting of an insulating material of coherent and therefore non-pulverulent nature, which is generally secured to a plate such as 3 of plywood or like material by a glued connection, the aforesaid spacer elements must be made from a material having preferably a coefficient of heat expansion inferior to that of this insulating material constituting the intermediate layer in order to promote the creation of a certain prestress compressing said intermediate insulating layer in case of temperature variations, so as to prevent the glued joint connecting said intermediate insulation to each plate such as 3 or 4 from being torn up.

As already stated the division of the insulation into separate panels permits of reducing heat stress and facilitating the locating of insufficient fluid-tightness.

FIGURES 8 to 13 illustrate a modified form of embodiment wherein the respectively primary and secondary barriers 28, 29 are separated by at least one intermediate stress distributing layer 30 consisting of the aforesaid juxtaposed preferably rigid or stiffened plates of insulating material, such as the panels 31 of square or like configuration, made of wood, plywood or the like, said barriers being applied and secured to the opposite faces of said panels at discrete points of fixation connected to said spacer elements 32 acting as insulating cleats, brackets or blocks, for example of lamellar or compressed wood about one inch thick. The plywood panels 31 are practically abutting against each other but nevertheless they can move separately in relation to each other for example under the influence of temperature variations. The aforesaid spacer elements, which permit of supporting and transmitting the tear and creep or sliding stresses induced by the aforesaid barriers as a consequence of a temperature variation or of external applied forces, bear with a front or end face 33 against the secondary barrier 29 and support the plates 31 by connecting them directly to the supporting structure 1 constituting for example the ship's hull, whereas all the intermediate space available between the secondary barrier and said hull is filled with an intermediate layer of insulating material 5a such as polyurethane or the like, preferably of cellular texture and having a thickness of the order of 8½″. By way of example and to give a practical example the aforesaid barriers 28 and 29 are made from stainless steel sheet-metal stock, for example 0.04″ thick sheets in the case of the primary barrier 28 and 0.02″ in the case of the secondary barrier 29, the intermediate or interleaf plywood having in this case a thickness of, say, 0.6″.

Figure 8:
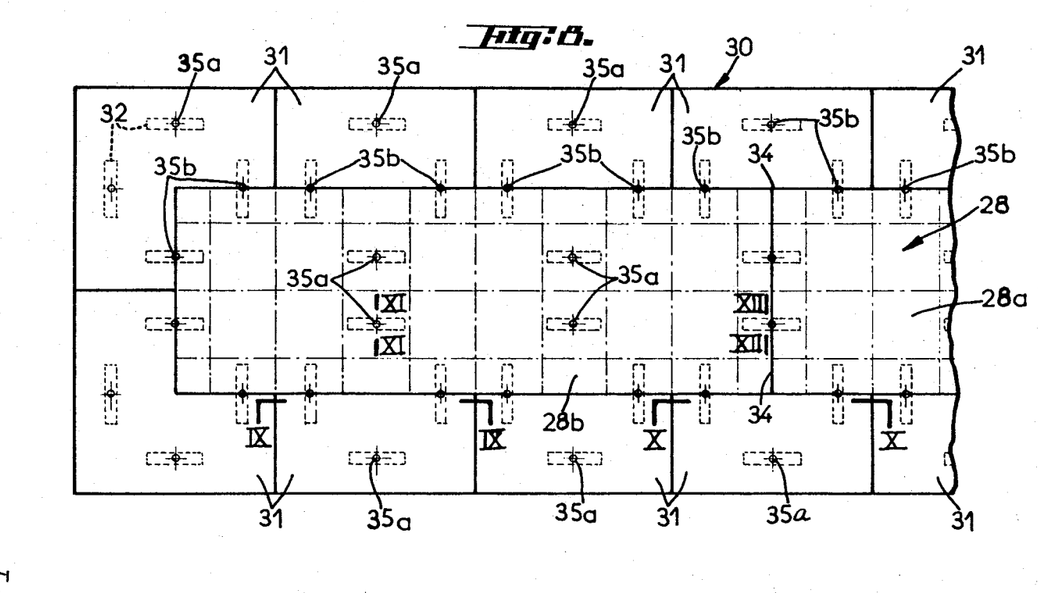
FIGURE 8 is a fragmentary front view showing on a smaller scale from the inside the inner wall of a tank comprising spaced primary and secondary barriers held by juxtaposed panels of rigid insulating material which are secured directly to the supporting structure by means of spacing elements.
Figure 9:
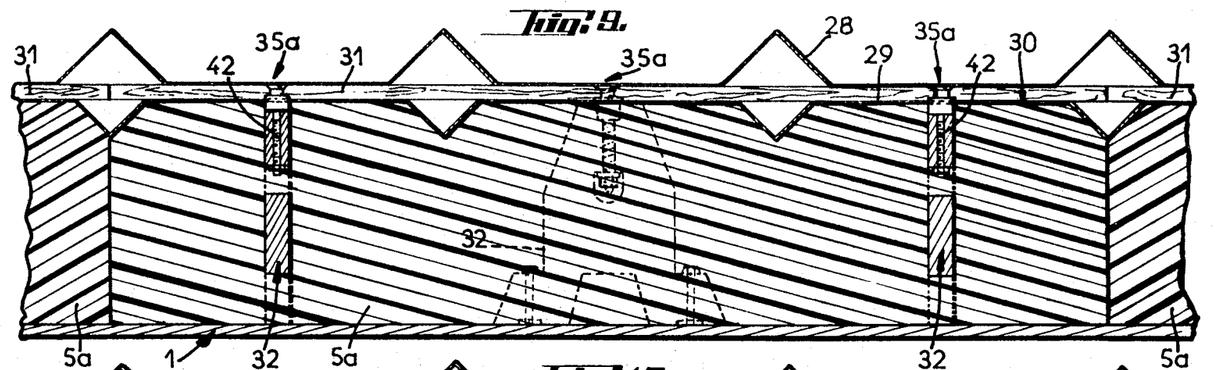
FIGURE 9 is a section taken on a larger scale upon the line IX—IX of FIGURE 8.

FIGURE 8 illustrates in fragmentary view the intermediate layer 30 consisting of juxtaposed panels 31 and partially lined with two adjacent metal plates 28a and 28b of the primary barrier 28 assembled along an overlapping and preferably welded joint 34. The primary and secondary barriers are each formed with two perpendicular series of substantially parallel spaced corrugations having their waves separated by substantially flat surface portions. The corrugations of each barrier project preferably on one side only so that the opposite side is substantially flat with a view to bear conveniently against the intermediate stress distributing layer 30. The waves of the primary barrier are preferably larger than those of the secondary barrier and the corrugations of the two barriers are preferably substantially registering with each other by superposition. The intermediate insulation 5a constitutes also in this case a relatively compact block corresponding substantially to the dimensions of each panel 31 and in adhesive contact, if desired, with the secondary barrier 29 and structure 1. It is advantageous for example that at least one linear dimension of each panel corresponds approximately to an integer multiple of the pitch or wavelength of the corrugations of the primary and secondary barriers respectively, whereby the joint separating two adjacent panels and the corresponding insulating blocks 5a lies substantially in the plane passing through the ridges or crests of a pair of superposed corrugations belonging respectively to the primary barrier 28 and to the secondary barrier 29.

FIGURE 8 shows the local fastening points of panels 31 on the spacer elements 32 and these points may be grouped or classified in two series or types 35a and 35b. The fastening points 35a are for securing the panels 31 and the secondary barrier 29 on the spacer elements 32 at locations disposed right in the middle of the sheet-metal area, that is, remote from the edges of each metal plate constituting the primary barrier 28 and possibly the secondary barrier 29 (assuming that the sheet-metal elements constituting the two barriers have approximately the same dimensions, so that the lap-joints in the two barriers are relatively close but preferably shifted in relation to each other as shown for example in FIGURE 10). The fastening points 35b are used for securing at the same time the primary barrier 28, the intermediate panels 31 and the secondary barrier 29 to the aforesaid spacer elements 32, and these points lie in the vicinity of the welded lap-joints assembling the adjacent metal plates constituting the primary barrier 28.

Figure 10:
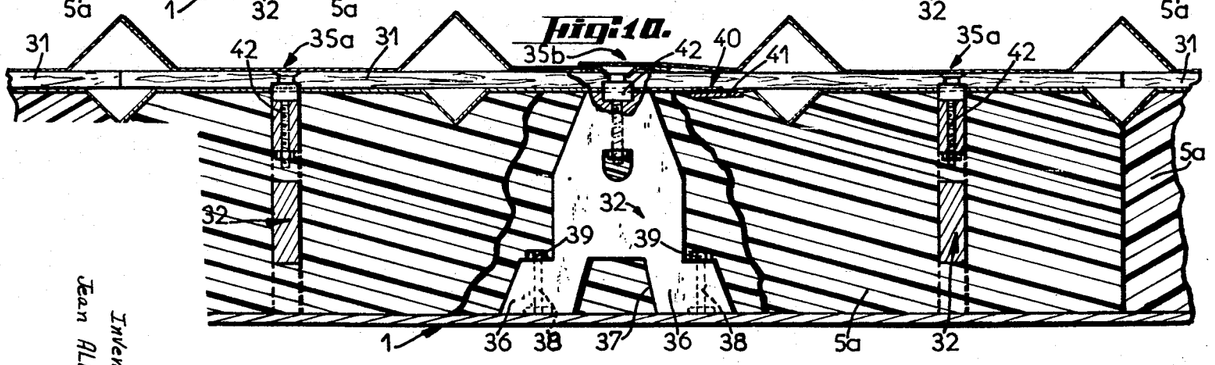
FIGURE 10 is another section taken upon the line X—X of FIGURE 8.

Each spacer element 32 is advantageously of approximately trapezoidal configuration and comprises at least two lateral securing lugs 36 spaced from each other by the width of said spacer element and separated by an open recess 37 constituting a notch opening at the bottom of the spacer element where said lugs are located (see FIGURE 10). Each spacer element 32 is secured by its lugs 36 to the structure or hull 1 by means of at least two studs or like member 38 extending through said fastening lugs and rigid with said structure 1 to which they may be welded or otherwise secured so as to extend substantially at right angles to the wall 1. Each stud receives a screwed tightening nut 39. The purpose of said recess 37 is to reduce as much as possible the extent of each spacer element 32 so as to decrease its heat conductibility, for due to its compacity or mass superior to that of the intermediate material 5a, it has a lower heat insulating capacity.

All the mechanical fastening members utilized for assembling the components must be made from a material imparting the necessary heat resistance thereto under working conditions, such as stainless steel, light alloy, copper alloy or any other equivalent materials.

The sheet metal elements constituting the secondary barrier are advantageously welded with lap-joints such as 40 (FIGURE 10) separated from the intermediate insulating layer 5a by butt-straps consisting of asbestos or glass fabric strips 41 in order to protect this intermediate insulation from the heat released or evolved during the welding operation.

Figure 11:
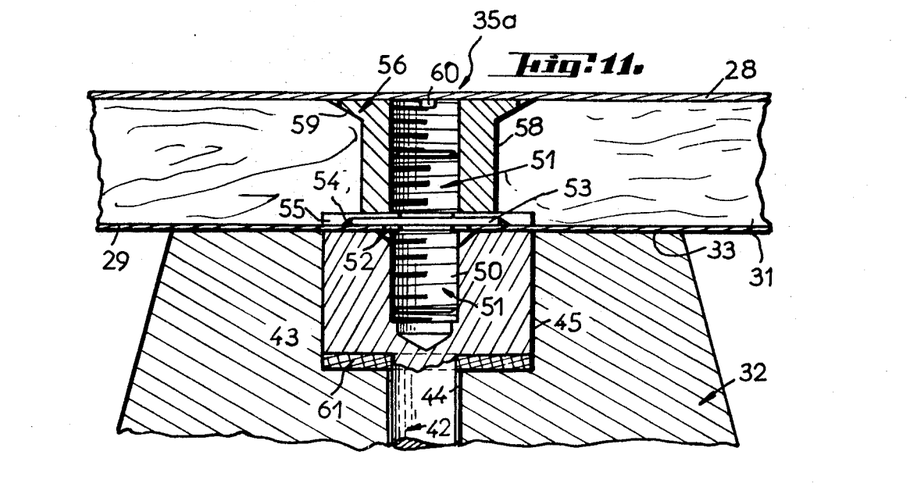
FIGURE 11 is a section taken on a larger scale upon the line XI—XI of FIGURE 8 across a fastening of the secondary barrier alone.
Figure 12:
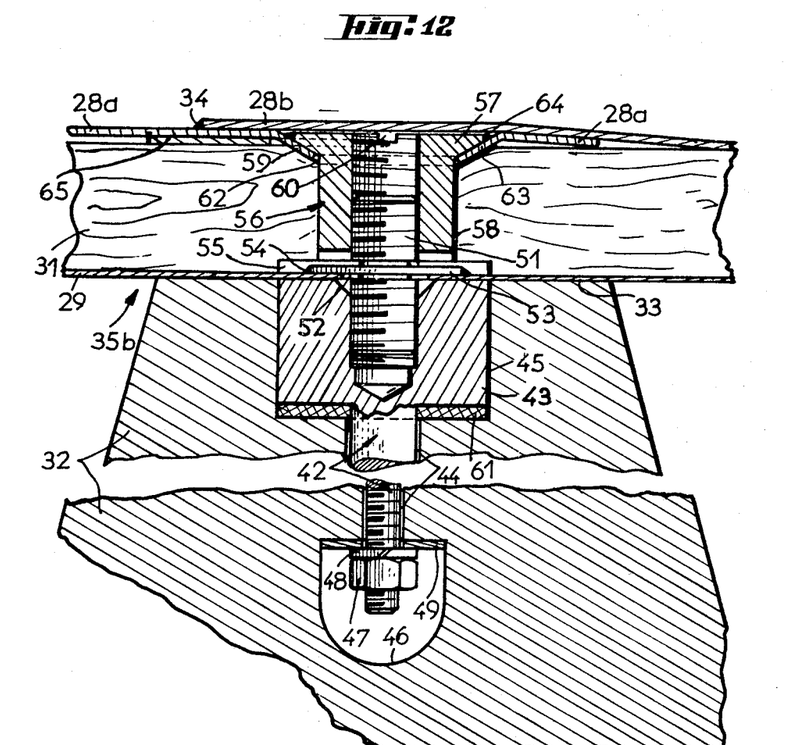
FIGURE 12 is a section taken on a larger scale upon the line XII—XII of FIGURE 8 across the fastening of a primary and a secondary barrier respectively.

The method of securing each fastening point 35a or 35b aforesaid comprises the use of at least one bolt or the like 42 having a preferably square head 43 mounted longitudinally in the thickness of each spacer element 32 substantially at right angles to the structure 1 and extending through a hole 44 formed to this end in the spacer element. This hole 44 opens in the end front face 33 constituting the minor base of the spacer element through the medium of a recessed portion, counter-bore or like cavity 45 corresponding in shape to the square head 43 and in which said head is embedded or countersunk so as to be flush with the end face 33 with which the spacer element bears against the secondary barrier 29 (FIGURES 11 and 12). The hole 44 opens at its opposite end into an accessible recess or cavity 46 of spacer element 32 in which the screw-threaded end of bolt 42 with the relevant nut 47 and a washer or the like 48 are sunk or housed, this washer being for example of the self-locking type and interposed between the nut 47 and a protecting bar or like strip member 49 bearing against a flat bottom or face of said recess or cavity 46 (see FIGURE 12).

Figure 13:
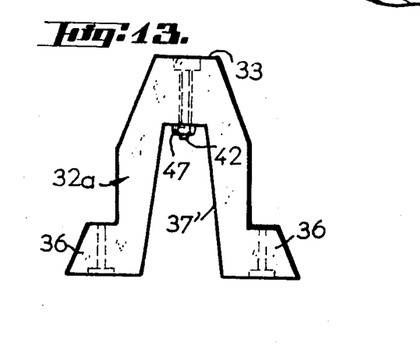
FIGURE 13 illustrates on a smaller scale a modified configuration of the connecting spacer element.

In an alternate form of embodiment shown in FIGURE 13 the recess 47 may consist of a notch 37' separating the fastening lugs 36 of said spacer element and having an extension, elongated or widened, in the direction of its small base 33.

Each bolt head 43 is formed with a blind axial tapped hole 50 opening in the substantially plane face of said head and adapted to have screwed therein a stud or like member 51 extending through a coresponding hole 52 of the secondary barrier 29. To this end, the edge of the aforesaid blind hole 50 is advantageously cleared by a bevel or countersunk portion. Each stud 51 comprises at an intermediate location a shoulder, ledge or neck portion, or preferably a small collar or washer 53 projecting considerably beyond the hole 52 in the secondary barrier 29 and adapted to press this barrier 29 against the end flat face 33 of spacer element 32. This collar 53 is rigid with the stud 51 and fastened to the secondary barrier 29 by means of a peripheral assembly joint of the fluid-tight overlapping type 54, for example a welded lap-joint. To this end, each panel 31 comprises a cavity or hollow portion 55 registering with each fastening point 35 which constitutes a kind of countersunk cavity opening into its face bearing against the secondary barrier 29 and adapted to receive with clearance the aforesaid collar 53 with its weld seam.

The free end of each stud 51 extends through the panel 31 and the fastening of at least each panel 31 (and of the secondary barrier 29) at each fastening point 35 is completed by a securing nut consisting of a sleeve- or socket-forming hollow nut 56 having a flat countersunk head 57, formed with an axial blind tapped through hole and screwed on the stud 51 so as to extend preferably without clearance through a corresponding hole 58 formed in plate 31, whereby this plate is clamped or tightened by the nut head 57 against the secondary barrier 29 and spacer element 32. To this end, each hole 58 opening at one end into the aforesaid countersunk cavity 55 comprises at its opposite end a bevelled or flared edge 59 adapted to receive completely or partially the head 57 of nut 56. Each nut head is covered or concealed by the primary barrier 28 bearing directly against this head. To facilitate the tightening and unscrewing or loosening of the nuts 56 the head 57 thereof is advantageously provided with notches, slots or castellations 60 adapted to receive corresponding projections of a spanner, wrench or other suitable tightening tool.

An asbestos washer or similar disc 61 is advantageously interposed between the head 43 of each bolt 42 and the substantially flat bottom of the correspondingly countersunk cavity 45 receiving said head.

FIGURE 11 illustrates the manner of fastening two adjacent sheet-metal or plate elements constituting the primary barrier 28 at a fastening point 35a remote from an assembly or welded lap-joint. In this case each nut or hollow screw 56 bears with its head 57 directly against the companion plate 31, said head being housed in the corresponding countersunk cavity 59 of this plate so that its outer end face be substantially flush with the corresponding face or side of plate 31 lined with the primary barrier 28 which is thus caused to simply and freely bear against the plate 31 and head 57.

FIGURE 12 illustrates the mode of fixation at a fastening point 35b adjacent to an assembly joint 34 aforesaid. In this case each nut or hollow screw 56 extends through a corresponding hole 62 formed with an in-turned flange 63 in a sheet-metal element 28a of the primary barrier, and its head 57 is pressed against the in-turned flange 63 of this hole which bears in turn against the wall of the countersunk cavity 59 of said hole. The head 57 is housed in the recess formed by the in-turned flange 63 and is advantageously locked by spaced spot or tack welds 64. The adjacent sheet-metal element 28b of the primary barrier covers the nut head 57 and the marginal portion of element 28a by being welded thereon along the aforesaid seam 34. A protecting strip 65 such as a metal strip is advantageously interposed between the sheet-metal element 28a and the plywood panel 31, substantially at and beneath the weld seam 34 throughout the length thereof.

Of course, this invention is by no means limited by the specific forms of embodiment described and illustrated herein which are given only by way of example.

What I claim is:

1. A heat-insulating fluid-tight continuous wall construction for a fluid-storing enclosed container space, successively comprising from outside to inside: an outer supporting structure; at least one sheet of load bearing lagging consisting of a plurality of self-supporting substantially rectangular composite panels juxtaposed side-by-side and end-to-end and individually secured to said supporting structure, each one of said panels including at least one inner layer formed by a substantially stiff plate of heat insulating material, at least one second layer of solid, heat insulating filling material, and heat insulating connecting spacer means fastening said plate in spaced relation to said supporting structure thereby leaving therebetween an intermediate space substantially filled with said second layer of heat insulating filling material, said connecting spacer means having such a shape and relative orientation as to allow thermal expansion and contraction of said plate; at least one intermediate, substantially flexible, impervious, continuous sheet means, forming a secondary barrier and applied against, covering backed by and secured at discrete locations to one face of said inner insulating plate, and at least one inner substantially flexible, fluid confining and holding, impervious, continuous lining sheet-like skin, forming a primary barrier covering, backed by and fastened at discrete locations to said lagging in substantially registering relationship with said secondary barrier.

2. A construction according to claim 1, wherein each panel has a vertical position and said second layer of heat-insulating material is made of incoherent divided material filled in said intermediate space by being poured downwards therein and said connecting spacer means consist of at least two pairs of spacer elements each pair being arranged in substantially symmetrical relation to one diagonal of said plate and each spacer element having attached to its bottom face a block of coherent insulating material of such a shape and size that it substantially fills the dead-space located below the associated spacer element and shielded thereby from the poured falling divided material.

3. A construction according to claim 1, wherein said second layer of heat-insulating filling material consists of incoherent divided material and said connecting spacer means consist for each panel of at least one medial channel-like brace-lath extending substantially along the center line of said plate and having a web attached to said supporting structure and integral with two substantially parallel spaced flanges abutting by their longitudinal edges against and substantially at right angles to said plate, whereas at least two heat-insulating spacer elements are arranged in substantially parallel spaced relationship within the recess defined by said web and flanges of said brace-lath and are secured to said plate, respectively, the remaining space of said recess being filled with insulating material.

4. A construction according to claim 3, comprising at least another brace-lath substantially similar to and coextensive with in substantially parallel spaced relation to said medial brace-lath, along and straddling the gap of the joint between two confronting edges of the two plates of any two adjacent panels, whereby said edges of said plates are supported by and freely rest on the flanges of said other brace-lath and the recess of said latter if filled with insulating material.

5. A construction according to claim 3, wherein each spacer element forms a transverse partition within said brace-lath and is formed at its end adjacent to said inner plate with one shouldered projecting tit portion fitting snugly in a corresponding hole of said inner plate.

6. A construction according to claim 1, wherein said secondary barrier is interposed directly between the inside face of said inner stiff plate and said primary barrier, said primary barrier being secured to said lagging through anchoring members attached to said lagging and said secondary barrier being rigidly affixed to said anchoring members.

7. A construction according to claim 6, wherein both primary and secondary barriers are made of corrugated sheets, respectively, the corrugations of said barriers projecting inwards and outwards, respectively, and registering in substantially opposed relationship with each other; said secondary barrier being supported on supporting elements conforming in shape to the outer face of said secondary barrier and wherein are embedded said anchoring members, whereas said supporting elements are fastened to further anchoring members embedded in said inner stiff plates of said panels.

8. A construction according to claim 7, wherein said supporting elements are made from insulating material and are recessed to accommodate with clearance the outward projecting corrugations of said secondary barrier and said anchoring members, embedded in said supporting elements, are in substantially flush relation to the inside face thereof, whereas said anchoring members embedded in said inner stiff plates are in substantially flush relation to the inside face of said inner stiff plates, said primary barriers and said supporting elements being secured by screw means to their respective anchoring members.

9. A construction according to claim 1, wherein said secondary barrier is separated from said primary barrier by said plate of each panel which is therefore interposed between both barriers, and forms a stress distributing layer; both barriers being fastened to said plate of each panel at discrete fastening points by attachment means connected to said connecting spacer means, respectively; said connecting spacer means consisting of spacer elements having each one a front end face bearing against said secondary barrier and supporting said plate whereas said second layer of insulating material fills the intermediate space between said secondary barrier and said supporting structure.

10. A construtcion according to claim 9, wherein each spacer element is formed with at least two fastening lugs spaced apart according to its width and separated by an open recess, each lug being secured to said supporting structure by at least one stud, integral with the latter and extending through said lug.

11. A construction according to claim 10, wherein said attachment means comprise at each fastening point: at least one bolt mounted in a hole of the associated spacer element, substantially at right angles to said supporting structure and having its head embedded in a corresponding recess of said spacer element so as to be flush with the front end face thereof bearing against said secondary barrier; said bolt head being formed with a tapped axial bore; a stud threaded in said bore and extending through a corresponding hole of said secondary barrier and integral, at an intermediate point thereof, with a collar for providing a tight engagement of said secondary barrier with said spacer element; said collar being at least peripherally secured in overlapping sealing relationship to said secondary barrier; and a nut member for fastening at least said plate intermediate said barriers, consisting of a hollow, sleeve-like, button-headed, internally threaded screw, threaded on said stud and extending with clearance through said plate while tightening same; said nut member being covered by said primary barrier.

12. A construction according to claim 11, wherein said primary barrier is made of a plurality of sheet elements assembled in overlapping relationship along fluid-tight joints, and at each fastening point which is remote from such a fluid-tight joint, said nut member directly bears with its head against said plate in a corresponding countersunk recess thereof.

13. A construction according to claim 11, wherein said primary barrier is made of a plurality of sheet elements assembled in overlapping relationship along fluid-tight joints, and at each fastening point adjacent such a joint, said nut member extends through a corresponding hole with an outward creased edge of one sheet element of said primary barrier, and its head presses against said creased edge and is covered by the adjacent sheet element of said primary barrier.

14. A construction according to claim 11, wherein the threaded end of said bolt, together with its nut and washer are housed in said recess formed between said lugs of said spacer element.

15. A construction according to claim 11, wherein both primary and secondary barriers are made of corrugated sheets, respectively, the corrugations of said barriers projecting inwards and outwards, respectively, and registering in substantially opposed relationship with each other; said secondary barrier being supported on insulating shaped supporting elements accommodating with clearance the outward projecting corrugations of said secondary barrier thereby conforming in shape to the outer face of said secondary barrier and in which supporting elements are embedded said anchoring members in flush relation to the inside face of said supporting elements, whereas said supporting elements are fastened to further anchoring members embedded in said inner stiff plates of said panels in flush relation to the inside face of said inner stiff plates, said primary barriers and said supporting elements being secured by screw means to their respective anchoring members.

16. A construction according to claim 11, wherein each collar is housed in a corresponding recess formed in the outside face of the associated inner plate.

17. A heat-insulating fluid-tight continuous wall construction for a fluid-containing enclosed space, successively comprising from outside to inside: an outer supporting structure; at least one sheet of load bearing lagging consisting of a plurality of self-supporting substantially rectangular composite panels juxtaposed side-by-side and end-to-end and individually secured to said supporting structure; and at least one inner substantially flexible, fluid-confining, impervious, continuous, lining sheet-like skin forming a primary barrier covering, backed by, fastened to and carried by said lagging, each one of said panels including at least one inner layer formed by a substantially stiff plate of heat-insulating material, at least one second layer of solid, heat-insulating filling material, and heat-insulating connecting spacer means fastening said plate in spaced relation to said supporting structure thereby leaving an intermediate space substantially filled with said second layer of heat insulating filling material; said connecting spacer means having such a shape and relative orientation as to allow thermal expansion and contraction of said plate; whereas said second layer of heat insulating filling material consists of incoherent divided material and said connecting spacer means consist for each panel of at least one medial channel-like brace-lath extending substantially along the center-line of said plate and having a web attached to said supporting structure and integral with two substantially parallel spaced flanges abutting by their longitudinal edges against and substantially at right angles to said plate, at least two heat-insulating spacer elements being arranged in substantially parallel spaced relationship within the recess defined by said web and flanges of said brace-lath and secured to said plate, respectively, the remaining space of said recess being filled with insulating material.

18. A construction according to claim 17, comprising at least another brace-lath substantially similar to and co-extensive within substantially parallel spaced relation to said medial brace-lath along and straddling the gap of the joint between two confronting edges of the two plates of any two adjacent panels, whereby said edges of said plates are supported by and freely rest on the flanges of said other brace-lath and the recess of said latter is filled with insulating material.

19. A construction according to claim 17, wherein each spacer element forms a transverse partition within said brace-lath and is provided at its end adjacent to said inner plate with at least one shouldered projecting tit portion fitting snugly into a corresponding hole of said inner plate.

20. A construction according to claim 17, comprising at least one intermediate, substantially flexible, impervious, continuous, sheet-means, forming a secondary barrier directly interposed between said primary barrier and the inside face of said inner insulating plate, thereby being tightly engaged with said plate and primary barrier, said primary barrier being attached at discrete locations to said lagging through anchoring members fitted in said lagging and rigidly connected in sealing relationship with said secondary barrier.

21. A construction according to claim 20, wherein both primary and secondary barriers are made of corrugated sheets, respectively, the corrugations of said barriers projecting inwards and outwards, respectively, and registering in substantially opposed relationship with each other; said secondary barrier being supported on insulating supporting elements conforming in shape to the outside face of said secondary barrier, and provided with grooves to accommodate with clearance the outward projecting corrugations of said secondary barrier, said supporting elements having anchoring members embedded therein in bush relation to the inside face of said supporting elements and being fastened to further anchoring members embedded in said inner stiff plates of said panels, in flush relation to the inside face of said inner stiff plates, said primary barrier and said supporting elements being secured by screw means to their respective anchoring members.

22. A heat-insulating fluid-tight continuous wall construction for a fluid-containing enclosed space, successively comprising from outside to inside: an outer supporting structure; at least one sheet of load bearing lagging consisting of a plurality of self-supporting substantially rectangular composite panels juxtaposed side-by-side and end-to-end and individually secured to said supporting structure; each one of said panels including at least one inner layer formed by a substantially stiff plate of heat insulating material, at least one second layer of solid, heat-insulating filling material, and heat-insulating connecting spacer means fastening said plate in spaced relation to said supporting structure; at least one inner substantially flexible, fluid-confining, impervious, continuous, lining sheet-like skin forming a primary barrier covering as a facing backed by, fastened to and carried by said lagging while being directly applied against the inside face of said inner plates thereof; and at least one intermediate, substantially flexible, impervious, continuous sheet means forming a secondary barrier covering as a facing, applied against, backed by and attached to the outside face of said inner plate which is therefore interposed between both barriers and forms a stress distributing layer; both barriers being fastened to said plate of each panel at discrete fastening points by attachment means connected to said connecting spacer means, respectively; said connecting spacer means having such a shape and relative orientation as to allow thermal expansion and contraction of said plates and consisting of spacer elements having each one a front end face bearing against said secondary barrier and supporting said plate whereas said second layer of insulating material fills the intermediate space left between said secondary barrier and said supporting structure.

23. A construction according to claim 22, wherein each spacer element is formed with at least two fastening lugs spaced apart according to its width and separated by an open recess, each lug being secured to said supporting structure by at least one stud, integral with the latter and extending through said lug.

24. A construction according to claim 23, wherein said attachment means comprise at each fastening point: at least one bolt mounted in a hole of the associated spacer element, substantially at right angles to said supporting structure, and having its head embedded in a corresponding recess of said spacer element so as to be flush with the front end face thereof bearing against said secondary barrier; said bolt head being formed with a tapped axial bore; a stud threaded in said bore and extending through a corresponding hole of said secondary barrier and integral at an intermediate point thereof with a collar for providing a tight engagement of said secondary barrier with said spacer element; said collar being at least peripherally secured in overlapping sealing relationship to said secondary barrier; and a nut member for fastening at least said plate intermediate said barriers, consisting of a hollow, sleeve-like, button-headed, internally threaded screw, threaded on said stud and extending with clearance through said plate while tightening same; said nut member being covered by said primary barrier.

25. A construction according to claim 24, wherein said primary barrier is made of a plurality of sheet elements assembled in overlapping relationship along fluid-tight joints, and at each fastening point which is remote from such a fluid-tight joint, said nut member directly bears with its head against said plate in a corresponding countersunk recess thereof.

26. A construction according to claim 24, wherein said primary barrier is made of a plurality of sheet elements assembled in overlapping relationship along fluid-tight joints, and at each fastening point adjacent to such a joint, said nut member extends through a corresponding hole, with an outward creased edge of one sheet element of said primary barrier, and its head presses against said creased edge and is covered by the adjacent sheet element of said primary barrier.

27. A construction according to claim 24, wherein the threaded end of each one of said bolts, together with its nut and washer are housed in said recess formed between said lugs of each respective spacer element.

28. A construction according to claim 24, wherein each collar is housed in a corresponding recess formed in the outside face of the associated inner plate.

29. A heat-insulating, fluid-tight continuous wall construction for a fluid-containing enclosed space, successively comprising from outside to inside: an outer supporting structure; at least one sheet of load bearing lagging consisting of a plurality of self-supporting, substantially rectangular composite panels juxtaposed side-by-side and end-to-end and individually secured to said supporting structure; and at least one inner, substantially flexible, fluid-confining, impervious, continuous, lining sheet-like skin, forming a primary barrier, covering fastened to, back and carried by said lagging; each one of said panels including at least one inner layer formed by a substantially stiff plate of heat-insulating material; at least one outer layer formed by a substantially rigid plate of heat-insulating material fastened to said supporting structure and spaced in substantially parallel relationship from said inner stiff plate by two pairs of substantially rectangular, flat, connecting spacer elements secured to both plates and arranged near the sides of said panel, respectively, in substantially symmetrical relation to the axis of symmetry of and normal to said panel; the space between both plates being filled by an intermediate layer of solid heat-insulating material; said spacer elements being arranged in substantially symmetrical relationship with respect to the two perpendicular intersecting planes of symmetry of said panel so as to bear edgewise with two opposite narrow end faces against said plates and to extend substantially at right angles with their two opposite large side faces to said planes in order to promote the tendency of said spacer elements to tilt in the directions of the lines of intersection of said planes of symmetry with said plates, respectively.

30. A construction according to claim 29, comprising at least one intermediate substantially flexible, impervious, continuous, sheet means, forming a secondary barrier directly interposed between said primary barrier and the inside face of said inner stiff plate so as to cover and to be applied against and backed by the latter, said primary barrier being secured to said lagging through anchoring members attached to said lagging and said secondary barrier being rigidly affixed to said anchoring members, whereby said primary and secondary barriers are tightly applied against each other in mutually direct engaging relationship substantially throughout their whole surfaces while being fully supported by said lagging.

31. A construction according to claim 29, wherein each spacer element is formed with a pair of tit-like projections protruding in substantially coaxial relationship from said opposite narrow end faces, respectively, of said spacer elements so as to snugly fit into a complementary recess formed in the associated plate, said inner and outer plates being secured by screw means to said spacer elements, respectively.

32. A substantially vertical, heat-insulating, fluid-tight, continuous wall construction for a fluid-containing enclosed space, successively comprising from outside to inside: an outer supporting structure; at least one sheet of load bearing lagging consisting of a plurality of self-supporting, substantially rectangular, composite, modular panels juxtaposed side-by-side and end-to-end and individually secured to said supporting structure; each one of said panels including at least one inner layer, formed by a substantially stiff plate of heat insulating material, at least one second layer of solid heat-insulating, filling material and heat-insulating, connecting spacer means fastening said plate in spaced relation to said supporting structure thereby leaving an intermediate space substantially filled with said second layer of heat-insulating, filling materal; and at least one inner substantially flexible, fluid-confining, impervious, continuous, lining sheet-like skin forming a primary barrier covering, fastened at discrete locations to, backed and carried by said lagging; each panel having a vertical position and said second layer of heat insulating material being made of non-coherent divided material filled from above in said intermediate space by being poured downwards therein, said connecting spacer means consisting of at least two pairs of elongated rectangular flat spacer elements orientated so as to allow thermal expansion and contraction of said plate, each pair being arranged so that the faces of the spacer elements are perpendicular to and in substantially symmetrical relation to a different one of the intersecting normal diagonal planes of said panel and each spacer element having attached, to its lower downward facing face, a block of coherent insulating solid material of such a substantially prismatic triangular shape and size that it substantially fills that dead space which is located below the associated spacer element and shielded thereby from the poured falling divided material.

References Cited
UNITED STATES PATENTS

| | | | |
|---|---|---|---|
| 2,174,988 | 10/1939 | Lundvall | 220—15 |
| 2,256,375 | 9/1941 | Bonsall | 220—15 |
| 2,983,401 | 5/1961 | Murphy | 220—9 |
| 3,079,026 | 2/1963 | Dosker | 220—9 |
| 3,125,192 | 3/1964 | Ramseur | 220—15 |
| 3,158,459 | 11/1964 | Guilhem | 220—15 |
| 3,302,358 | 2/1967 | Jackson | 220—9 |
| 2,892,563 | 6/1959 | Morrison | 220—15 |
| 2,928,566 | 3/1960 | Morrison | 220—9 |

THERON E. CONDON, *Primary Examiner.*

JAMES R. GARRETT, *Examiner.*

UNITED STATES PATENT OFFICE
CERTIFICATE OF CORRECTION

Patent No. 3,392,866

July 16, 1968

Jean Alleaume

It is certified that error appears in the above identified patent and that said Letters Patent are hereby corrected as shown below:

In the heading to the printed specification, line 6, for "July 10, 1965" read -- July 10, 1964 --.

Signed and sealed this 15th day of July 1969.

(SEAL)
Attest:

Edward M. Fletcher, Jr.
Attesting Officer

WILLIAM E. SCHUYLER, JR.
Commissioner of Patents